(12) United States Patent
Myer et al.

(10) Patent No.: US 9,145,213 B2
(45) Date of Patent: Sep. 29, 2015

(54) GAS TURBINE ENGINE CONFIGURATION INTERFACE

(71) Applicant: Rolls-Royce North American Technologies, Inc., Indianapolis, IN (US)

(72) Inventors: Joseph D. Myer, Avon, IN (US); Steven W. Tomlinson, Brownsburg, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 79 days.

(21) Appl. No.: 14/132,891

(22) Filed: Dec. 18, 2013

(65) Prior Publication Data

US 2015/0203209 A1    Jul. 23, 2015

Related U.S. Application Data

(60) Provisional application No. 61/784,666, filed on Mar. 14, 2013.

(51) Int. Cl.
| | |
|---|---|
| *G01C 23/00* | (2006.01) |
| *B63H 11/00* | (2006.01) |
| *B64D 31/06* | (2006.01) |
| *F02C 9/48* | (2006.01) |
| *B64D 31/00* | (2006.01) |
| *B64D 27/10* | (2006.01) |
| *F02C 6/20* | (2006.01) |
| *F02C 7/12* | (2006.01) |
| *F02C 9/00* | (2006.01) |
| *F02C 9/26* | (2006.01) |

(52) U.S. Cl.
CPC ............. *B64D 31/06* (2013.01); *B64D 27/10* (2013.01); *B64D 31/00* (2013.01); *F02C 6/20* (2013.01); *F02C 7/12* (2013.01); *F02C 9/00* (2013.01); *F02C 9/26* (2013.01); *F02C 9/48* (2013.01); *F05D 2220/323* (2013.01); *F05D 2270/051* (2013.01); *F05D 2270/07* (2013.01); *F05D 2270/20* (2013.01)

(58) Field of Classification Search
USPC ................................................ 701/3; 60/204
See application file for complete search history.

(56) References Cited

U.S. PATENT DOCUMENTS

| | | | |
|---|---|---|---|
| 4,468,924 A | 9/1984 | Moore | |
| 6,269,627 B1 * | 8/2001 | Freese et al. | ............. 60/39.24 |

(Continued)

FOREIGN PATENT DOCUMENTS

EP    2357134 A2    8/2011

OTHER PUBLICATIONS

International Search Report for PCT/US2013/070322 mailed Oct. 1, 2014.

*Primary Examiner* — Thomas G Black
*Assistant Examiner* — Tyler Paige
(74) *Attorney, Agent, or Firm* — Fishman Stewart Yamaguchi PLLC; Douglas P. LaLone

(57) ABSTRACT

A gas turbine engine is disclosed which is capable of being reconfigured for one operating mode to another. A display is provided that permits a pilot or other operator to select between engine modes. One aspect is the ability to provide variable cooling that can be controlled by various devices. The variable cooling features can be used with devices such as cooled turbine components like vanes and/or blades. Devices can be used to reconfigure the performance and/or operability of a gas turbine engine.

20 Claims, 3 Drawing Sheets

(56) References Cited

U.S. PATENT DOCUMENTS

| | | |
|---|---|---|
| 6,823,675 B2 | 11/2004 | Brunell et al. |
| 7,285,871 B2 | 10/2007 | Derouineau |
| 7,877,980 B2 | 2/2011 | Johnson |
| 2002/0134070 A1* | 9/2002 | Orlando et al. ............ 60/204 |
| 2008/0177456 A1 | 7/2008 | Hill et al. |
| 2008/0243352 A1 | 10/2008 | Healy |
| 2009/0173078 A1 | 7/2009 | Thatcher et al. |
| 2010/0017093 A1 | 1/2010 | Mahmood |
| 2010/0286890 A1 | 11/2010 | Chandler |
| 2011/0160979 A1 | 6/2011 | Muller |
| 2011/0167791 A1 | 7/2011 | Johnson et al. |
| 2011/0167792 A1 | 7/2011 | Johnson et al. |
| 2011/0202251 A1 | 8/2011 | Luppold |
| 2012/0317957 A1* | 12/2012 | Pesyna et al. ............ 60/204 |
| 2012/0321448 A1* | 12/2012 | Pesyna et al. ............ 415/145 |
| 2013/0199156 A1* | 8/2013 | Ress et al. ............ 60/224 |

* cited by examiner

GAS TURBINE ENGINE CONFIGURATION INTERFACE

CROSS-REFERENCE TO RELATED APPLICATIONS

This application claims priority to U.S. Provisional Patent Application No. 61/784,666 filed on Mar. 14, 2013, the contents of which are hereby incorporated in their entirety.

GOVERNMENT RIGHTS

This disclosure was made with government support under FA8650-07-C-2803 awarded by the United States Air Force. The government has certain rights in the disclosure.

TECHNICAL FIELD

The present disclosure generally relates to gas turbine engines capable of being configured in a variety of modes, and more particularly, but not exclusively, to changing modes of a variable gas turbine engine.

BACKGROUND

Providing the ability to change an operating mode of a gas turbine engine remains an area of interest. Some existing systems have various shortcomings relative to certain applications. Accordingly, there remains a need for further contributions in this area of technology.

SUMMARY

One embodiment of the present disclosure is a unique gas turbine engine capable of changing modes. Other embodiments include apparatuses, systems, devices, hardware, methods, and combinations for changing a mode of a gas turbine engine. Further embodiments, forms, features, aspects, benefits, and advantages of the present application shall become apparent from the description and figures provided herewith.

DETAILED DESCRIPTION

Figure 1:
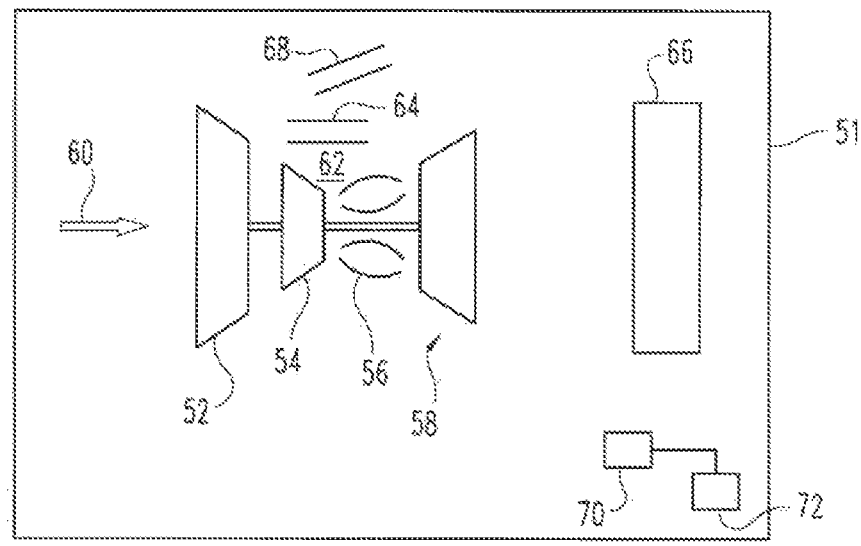
FIG. 1 depicts an embodiment of the gas turbine engine.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended. Any alterations and further modifications in the described embodiments, and any further applications of the principles of the disclosure as described herein are contemplated as would normally occur to one skilled in the art to which the disclosure relates.

With reference to FIG. 1, there is illustrated a schematic representation of one form of a gas turbine engine 50 used as a power plant for an aircraft 51. As used herein, the term "aircraft" includes, but is not limited to, airplanes, unmanned space vehicles, fixed wing vehicles, variable wing vehicles, unmanned combat aerial vehicles, tailless aircraft, and other airborne and/or extraterrestrial (spacecraft) vehicles. The gas turbine engine 50 includes a fan 52, compressor 54, combustor 56, and turbine 58. In one form of operation, a working fluid 60 such as air entering the gas turbine engine 50 is accelerated by the fan 52. Some of the working fluid enters a core passage 62 of the core engine which includes a passage through the compressor 54, combustor 56, and turbine 58. Working fluid that does not pass through the core passage 62 bypasses the core engine and flows in a fan bypass duct 64. After passing through the core engine an exhaust flow is discharged through a nozzle 66. In some forms the working fluid passing through the fan bypass duct 64 is combined with the exhaust flow prior to being discharged through the nozzle 66, but in other forms the working fluid passing through the fan bypass duct 64 can exit elsewhere.

The gas turbine engine 50 also includes a third stream bypass duct 68 capable of flowing a working fluid conveyed via a turbomachinery component powered by operation of the gas turbine engine 50. In one form the third stream bypass duct 68 is operable to withdraw a portion of working fluid traversing through the gas turbine engine 50, such as but not limited to through the fan bypass duct 64. In some embodiments the third stream bypass duct 68 can withdraw a portion of the working fluid at a location downstream of a fan that provides working fluid to the fan bypass duct 64. In yet another form the third stream bypass duct 68 can have its own turbomachinery component such as but not limited to a blade portion separated from and disposed radially outward of a fan bypass portion of a bladed turbomachinery component. The third stream bypass duct 68 is operable to convey a quantity of working fluid 60 to provide an additional thrust capability to the propulsion system and/or to provide an additional stream of pressurized air for use as a coolant or energy source. The relatively low temperature of the working fluid though the third stream bypass duct 68 can provide a thermal management heat sink and could allow use of relatively economical materials in exhaust ducting and liners. In one form the third stream bypass duct 68 can convey a quantity of working fluid 60 to be used as an additional energy source to provide power for electrical or mechanical devices. A flow of working fluid through the third stream bypass duct 68 can be combined with working fluid flowing through either or both of the fan bypass duct 64 and core passage 62 to flow through the nozzle 66, but some embodiments can include the working fluid through the third stream bypass duct 68 as exiting independent of any given nozzle that conveys one or more flows.

In one non-limiting embodiment the third stream bypass duct 68 can withdraw working fluid 60 from the fan bypass duct 64 at a location downstream of the fan 52. In this configuration the gas turbine engine 50 includes the core passage 62, fan bypass duct 64, and third stream bypass duct 68, all of which are capable of flowing some portion of a working fluid received through an inlet to the gas turbine engine 50. In some embodiments the third stream bypass duct 68 can flow a quantity of working fluid approaching that amount carried through the fan bypass duct 64. The third stream bypass duct 68 can withdraw working fluid 60 from the fan bypass duct 64 at locations other than those discussed above. To set forth just one non-limiting example, the third stream bypass duct 68 can withdraw working fluid at a location between fan stages.

The working fluid 60 withdrawn through the third stream bypass duct 68 can be recombined with an exhaust flow of the gas turbine engine 50 prior to being discharged to ambient conditions. For example, the working fluid that flows through the third stream bypass duct 68 can be recombined in the nozzle 66 with a working fluid that flowed through the core passage 62 and the fan bypass duct 64. Various embodiments of the nozzle 66 capable of combining flow from any of the core passage 62, fan bypass duct 64, and third stream bypass duct 68 will be described further below.

The gas turbine engine 50 can take any variety of forms. For example, the gas turbine engine 50 can have any number of spools capable of driving any number of compressor 54 and turbine 58 sections. In some forms the gas turbine engine 50 can be an adaptive cycle, variable cycle, combined cycle engine and can be used at a variety of flight conditions. As such, the aircraft 51 typically includes a sensor 70 and controller 72 for determining flight condition and operating one or more systems aboard the aircraft, such as but not limited to the gas turbine engine 50.

The sensor 70 can typically be used to measure aircraft flight condition such as speed and altitude, to set forth just two non-limiting examples, and can output any variety of data whether sensed or calculated. For example, the sensor 70 can sense and output conditions such as static temperature, static pressure, total temperature, and/or total pressure, among possible others. In addition, the flight condition sensor 70 can output calculated values such as, but not limited to, equivalent airspeed, altitude, and Mach number. Any number of other sensed conditions or calculated values can also be output. The flight condition sensor 70 provides data to the controller 72 and can output values in either analog or digital form.

The controller 72 is provided to monitor and control engine operations. The controller 72 can be comprised of digital circuitry, analog circuitry, or a hybrid combination of both of these types. Also, the controller 72 can be programmable, an integrated state machine, or a hybrid combination thereof. The controller 72 can include one or more Arithmetic Logic Units (ALUs), Central Processing Units (CPUs), memories, limiters, conditioners, filters, format converters, or the like which are not shown to preserve clarity. In one form, the controller 72 is of a programmable variety that executes algorithms and processes data in accordance with operating logic that is defined by programming instructions (such as software or firmware). Alternatively or additionally, operating logic for the controller 72 can be at least partially defined by hardwired logic or other hardware. In one particular form, the controller 72 is configured to operate as a Full Authority Digital Engine Control (FADEC); however, in other embodiments it may be organized/configured in a different manner as would occur to those skilled in the art. It should be appreciated that controller 72 can be exclusively dedicated control of the gas turbine engine 50 through manipulation of one or more variable features.

The gas turbine engine can be configured and reconfigured to provide a range of performance operations. Varying performance of a gas turbine engine through use of variable features is known and references are available that disclose variable feature useful to permit rapid changes in engine configuration through variable vanes, energy devices, fueling, etc. U.S. Patent Application Publication No. 2010/0162719 to Bowman, et al. published Jul. 1, 2010 is hereby incorporated herein by reference in its entirety and discloses only one manner of varying performance. Other references include U.S. Patent Application Publication No. 20120321448 to Pesyna, et al. published Dec. 20, 2012 also incorporated herein by reference. Other examples of reconfiguring a gas turbine engine are also known and appreciated in this technical area.

In general, various devices can be used to reconfigure a gas turbine engine. For example, the variable features can include flaps, vanes, valves, doors, fuel injector flow metering devices, nozzle variable area mechanisms, etc. along with any number of other mechanical devices. Variable cooling features are also included in the various devices that can be used to impact gas turbine engine performance and operability, and thus assist in changing configuration of the engine. Variable cooling features include cooling valves and/or cooling heat exchangers capable of providing cooling air to a cooled turbine component. The ability to provide variable cooling can be controlled by various devices such as valves, pumps, etc. The variable cooling features can be used with devices such as cooled turbine components like vanes and/or blades. In short, any number of devices can be used to reconfigure the performance and/or operability of a gas turbine engine.

As will also be appreciated, when reconfiguring the engine if too much power is withdrawn too quickly from the engine, or if too much demanded power is suddenly ceased, then stability and performance of the gas turbine engine can be negatively impacted. Such a negative impact can include any variety flow and/or dynamic instabilities, surge, stall, etc. Accommodating the avoidance of a negative impact to stability and/or performance can include sizing components that consume power from the gas turbine engine such that a maximum consumed power is limited. Alternative and/or additional accommodation can include configuring the engine to maintain a relatively high spool speed but with relatively closed variable vane features where the vanes can be quickly reconfigured to be more open with an attendant relatively quick increase in fuel flow to the combustor. Other strategies can be used to accommodate a given magnitude and duration of demanded power, the onset rate of the demanded power. For example, a combination of engine pre-configuration that seeks to anticipate a large change in demanded power with an acceptable level of thrust output decrease can be used in the power off-take mode.

Figure 2:
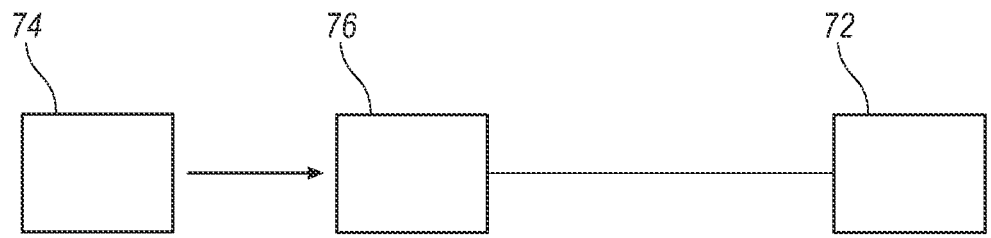
FIG. 2 depicts an embodiment of a pilot changing a motive the gas turbine engines via a display.
Figure 3:
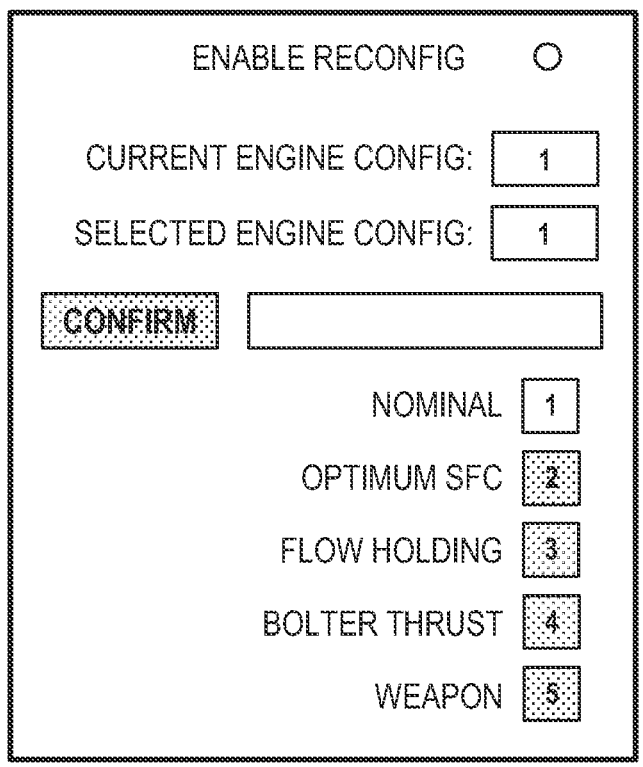
FIG. 3 depicts an embodiment of a display.
Figure 4:
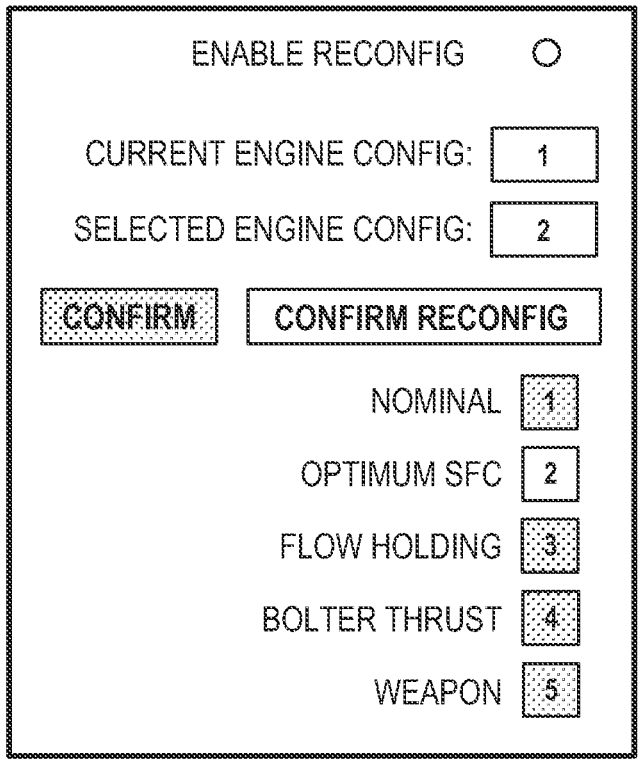
FIG. 4 depicts an embodiment of a display.
Figure 5:
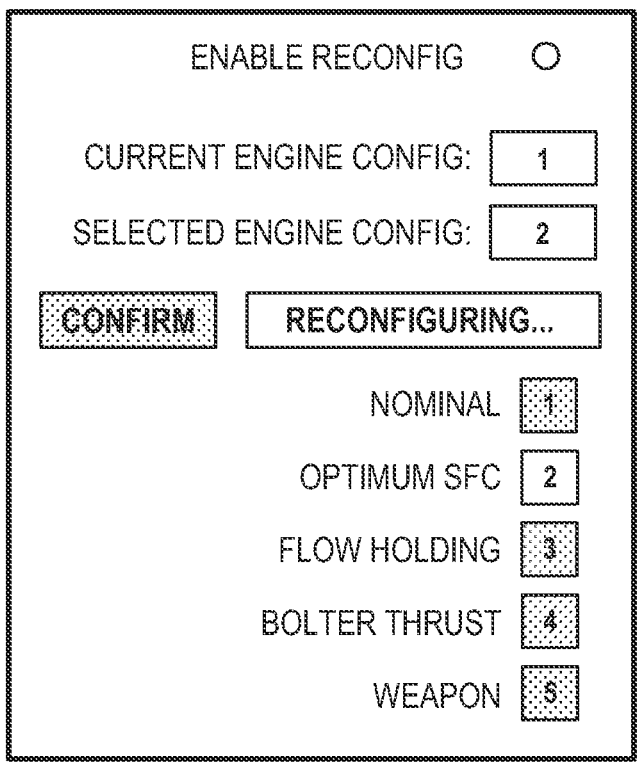
FIG. 5 depicts an embodiment of a display.
Figure 6:
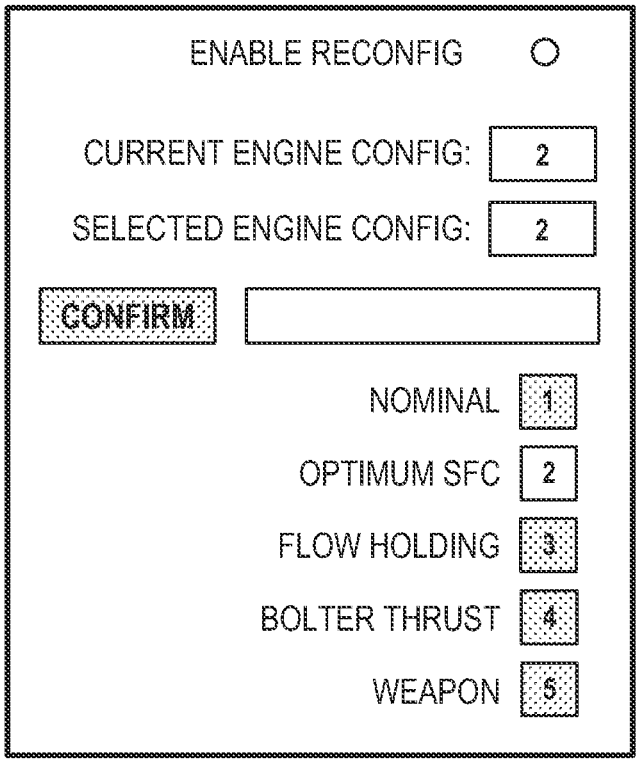
FIG. 6 depicts an embodiment of a display.

As seen in FIG. 2, a pilot or other operator 74 can interact with the controller 72 through the use of a display 76 in which a number of control mode options are provided. The control mode options can correspond to various configurations of the gas turbine engine which will be described further below. The display 76 can be a single or multi-function display. Such a display 76 can include one or more buttons at a periphery of the display useful to interact with a system that will configure the engine and/or aircraft. In some forms the display 76 can be a touch screen. Interactivity between the system and the operator 74 can occur exclusively through the touch screen or can occur through a combination of touch screen commands and traditional buttons/switches/etc. that typically populate an aircraft cockpit. The display 76 can be used to select between many engine modes. The figure illustrates the ability to choose between five modes: nominal; optimum SFC, flow holding, bolter thrust, and weapon. Some embodiments can include a subset of the selection depicted in which the subset includes at least two modes. Any subset that includes at least two modes is contemplated as there are only five modes and therefore there are a finite number of subsets available. Discussed below are various modes contemplated for use by the pilot/operator through the display 76.

Nominal mode is a mode that configures the engine for a best SFC for any particular thrust setting and which allows the engine to be moved quickly to a higher thrust setting. It will be appreciated that best SFC configuration and the ability to move to a higher thrust setting can be varied from application to application according to a tradeoff between desired SFC and desired transient engine performance.

Optimum SFC is a mode which places the engine 50 in a condition for optimum SFC at a specific thrust setting. For example, the optimum SFC mode can be used during a loiter operation of the aircraft 52.

Flow holding is a mode which places the engine 50 in condition to vary thrust at a constant third stream flow to aid in thermal management (heat sink) and/or to vary thrust at constant inlet flow to reduce thrust drag. The constant third stream flow can be 100% max flow, but other conditions are also contemplated such as 90% and 80%, for example. Such a condition can be characterized with a fan speed substantially at 100% while thrust varies between 55% and 100%; or a fan speed can be at substantially 90% while thrust varies between 55% and 90%; or a fan speed can be at substantially 80% while thrust varies between 55% and 80%; or a fan speed can be substantially at 70% while thrust varies between 55% and 70%; or a fan speed can be a substantially 60% while thrust varies between 55% 60%. The relative fan speed and thrust settings related to the flow holding mode as well as any other mode described herein are example embodiments only and no limitation is hereby intended regarding any specific application.

Bolter thrust is a mode which places the engine 50 in a condition which can quickly produce thrust if needed, such as in a bolter scenario sometimes associated with an aborted landing aboard an aircraft carrier. For example, the engine 50 can be configured such that fan speed is held at 100% and thrust is "spoiled" but quickly available for bolter conditions. In some forms it is contemplated that thrust can vary from between 55% and 100% when fan speed is held at substantially 100%, or thrust can vary from between 45% to 90% when fan speed is held at substantially 90%.

Power off take is used to extract power from the gas turbine engine 50 and provide the power to a power consuming device. Either or both mechanical and electrical power can be extracted. For example, an electrical generator can be integrated within the gas turbine engine and used to produce power to drive any number of electrical devices. The electrical generator can be driven by an off take shaft, and in other forms the generator is integrated along with rotating components of the gas turbine engine. Typically the power offtake is in the form of a mechanical shaft used to convey power to a mechanical device. In other forms the power off take can be or can be used to drive an electrical device that can include a directed energy device, such as a directed energy weapon. Other devices can be used.

In the modes described above, the bolter thrust, flow holding, and power off take modes can be characterized by a substantially constant fan speed.

Other modes are also contemplated such as a constant core speed mode with varying levels of thrust.

FIGS. 3-6 describe operation of the display as it interacts with the pilot or operator to change modes. Explanations are provided in each of the figures.

While the disclosure has been illustrated and described in detail in the drawings and foregoing description, the same is to be considered as illustrative and not restrictive in character, it being understood that only the preferred embodiments have been shown and described and that all changes and modifications that come within the spirit of the disclosures are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the disclosure, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. An apparatus for configuring a gas turbine engine, comprising:
    a gas turbine engine operation module structured to receive a requested engine configuration and control variable mechanical features of the gas turbine engine to achieve the requested engine configuration, the gas turbine engine operation module structured to provide a plurality of candidate operation modes for selection corresponding to a plurality of engine configurations, the plurality of candidate operation modes including:
    a nominal operation mode in which specific fuel consumption (SFC) is non-optimal in favor of rapid thrust response;
    an optimum SFC mode in which a cooling feature is in a minimum cooling setting;
    a bolster thrust operation mode in which the gas turbine engine is configured to produce a spoiled thrust through a variable mechanical feature that can be quickly reconfigured to produce a non-spoiled thrust;
    a flow holding operation mode in which fan speed is held and flow through an internal duct remains substantially constant while the gas turbine engine produces varying thrust levels through a configuration of variable mechanical features; and
    a power off-take mode in which engine is placed in a state that accommodates a heavy increase in demanded power without destabilizing the engine.

2. The apparatus of claim 1, which further includes an aircraft having a power plant capable of producing power to operate the aircraft, the power plant including a gas turbine engine having a core, a bypass flow path, and a third stream offtake.

3. The apparatus of claim 1, wherein the variable features include at least one of variable geometry turbomachinery components, variable fuel flow, variable nozzle geometry, variable inlet geometry and variable third stream duct features.

4. The apparatus of claim 1, further comprising a display in communication with the gas turbine engine operation module, wherein the display is structured to display a list of the plurality of candidate operation modes and receive an input selecting one of the plurality of candidate operation modes.

5. The apparatus of claim 1, wherein the variable cooling feature is a turbine cooling valve.

6. The apparatus of claim 1, wherein the requested engine configuration is provided to the gas turbine engine operation module via at least one of a touch screen display and a display having a physical button.

7. The apparatus of claim 6, wherein the display is structured to display a list of the plurality of candidate operation modes as well as to display a confirmation of selection of requested engine configuration.

8. The apparatus of claim 1, wherein the gas turbine engine operation module is hosted in an engine controller.

9. The apparatus of claim 1, wherein the selected one of the plurality of candidate operation modes corresponds to the requested engine configuration.

10. A gas turbine engine configuration apparatus comprising:

an aircraft power management system having a computer based user interface capable of receiving a command from an operator, the computer based user interface structured to receive a command to place a gas turbine engine in one of a plurality of power modes by adjusting one or more variable features, wherein the plurality of power modes correspond to a plurality of engine configurations;

a module structured to receive the command from the computer based user interface and adjust the variable features of the gas turbine engine to change a configuration of the engine corresponding to one of the plurality of power modes, wherein the module includes the following power modes:

a nominal mode having a degraded specific fuel consumption (SFC) condition;

an SFC mode having an optimal SFC condition;

a bolter mode characterized by operating the fan at a relatively high speed and adjusting one or more variable features to spoil thrust, the bolter mode capable of producing a relatively rapid rise in thrust by re-adjusting the one or more variable features;

a flow holding mode in which the engine can produce a range of thrust conditions while keeping flow through a third stream bypass constant; and a power off-take mode characterized by operating the fan at substantially constant speed during a demanded power event with an attendant reduction in thrust;

wherein the computer based user interface includes a multi-function display structured to display a list of the plurality of power modes for selection, and wherein the selected power mode corresponds to the command.

11. The apparatus of claim 10, wherein the variable features include at least two of variable geometry turbomachinery components, variable fuel flow, variable nozzle geometry, variable inlet geometry, and cooling flow.

12. The apparatus of claim 11, wherein the cooling flow is a turbine cooling flow capable of varying one of a temperature and a flow rate of the cooling flow.

13. The apparatus of claim 11, wherein the variable features also include at least one of a variable mechanism to alter a flow rate through a third-stream duct.

14. The apparatus of claim 10, wherein the aircraft power management system is integrated with an aircraft having a gas turbine engine that includes a fan useful for generating thrust with a bypass duct and configured to remain aloft for a period of time useful to accomplish an aircraft task, the gas turbine engine having variable features including any of compressor variable vanes, turbine variable vanes, and a fuel delivery system capable of being modulated.

15. The apparatus of claim 14, wherein the variable features also include a turbine cooling feature, and wherein the aircraft power management system is structured to display a confirmation of a change in power mode.

16. The apparatus of claim 10, wherein the module is hosted in an engine controller.

17. A method for configuring a gas turbine engine comprising:

during operation of an aircraft gas turbine engine, receiving a request to change an engine operating mode between a first mode and a second mode from among a list of operating modes each corresponding to a predetermined engine configuration, the list including:

a nominal mode having a non-optimal specific fuel consumption (SFC) configuration;

an SFC mode having an fuel economizing configuration of variable feature of a vehicle;

a bolter mode in which fan speed is held at a go-around condition and thrust is spoiled by a variable feature;

a flow holding mode; and a weapon mode;

after the receiving a selection, receiving a confirmation of the request to change the engine operating mode;

reconfiguring a variable feature associated with operation of the gas turbine engine to accommodate the change between first mode and second mode of the gas turbine engine; and displaying a message that confirms operation of the second mode.

18. The method of claim 17, which further includes configuring a plurality of variable features to accommodate the change in engine operating mode.

19. The method of claim 18, wherein the gas turbine engine is an adaptive gas turbine engine having a third-stream duct.

20. The method of claim 18, wherein the configuring includes changing one of a fuel flow rate, a nozzle actuator position, a variable vane position, an inlet door position, a third stream variable.

* * * * *

UNITED STATES PATENT AND TRADEMARK OFFICE
CERTIFICATE OF CORRECTION

| | | |
|---|---|---|
| PATENT NO. | : 9,145,213 B2 | Page 1 of 1 |
| APPLICATION NO. | : 14/132891 | |
| DATED | : September 29, 2015 | |
| INVENTOR(S) | : Joseph D. Myer et al. | |

It is certified that error appears in the above-identified patent and that said Letters Patent is hereby corrected as shown below:

In the Claims:

At column 8, claim number 17, line number 21, change "an" to "a". (2nd occurrence)

It should read: ... mode having a fuel economizing...

At column 8, claim number 17, line number 27, delete "the" before the word receiving.

It should read: ... after receiving a selection...

Signed and Sealed this
Twenty-second Day of March, 2016

Michelle K. Lee
*Director of the United States Patent and Trademark Office*